(12) United States Patent
Maus et al.

(10) Patent No.: US 7,713,492 B2
(45) Date of Patent: May 11, 2010

(54) APPARATUS HAVING A FIBER MAT FOR MOUNTING A HONEYCOMB BODY IN AN EXHAUST PIPE FOR TREATING EXHAUST GASES FROM A MOBILE INTERNAL COMBUSTION ENGINE AND VEHICLE HAVING THE APPARATUS

(75) Inventors: Wolfgang Maus, Bergisch Gladbach (DE); Rolf Brück, Bergisch Gladbach (DE)

(73) Assignee: Emitec Gesellschaft fuer Emissionstechnolgie mbH, Lohmar (DE)

( * ) Notice: Subject to any disclaimer, the term of this patent is extended or adjusted under 35 U.S.C. 154(b) by 176 days.

(21) Appl. No.: 11/781,634

(22) Filed: Jul. 23, 2007

(65) Prior Publication Data

US 2008/0044318 A1 Feb. 21, 2008

Related U.S. Application Data

(63) Continuation of application No. PCT/EP2006/000494, filed on Jan. 20, 2006.

(30) Foreign Application Priority Data

Jan. 21, 2005 (DE) .................. 10 2005 002 929

(51) Int. Cl.
*B01D 50/00* (2006.01)
(52) U.S. Cl. ..................................... 422/179
(58) Field of Classification Search ................. 422/168, 422/177, 179, 180; 428/116; 55/523; 60/274
See application file for complete search history.

(56) References Cited

U.S. PATENT DOCUMENTS

| 3,854,888 | A | 12/1974 | Frietzsche et al. |
| 4,004,888 | A | 1/1977 | Musall et al. |
| 4,158,037 | A | 6/1979 | Aoyama |
| 4,269,807 | A | 5/1981 | Bailey et al. |
| 5,290,522 | A | 3/1994 | Rogers et al. |
| 5,882,608 | A | 3/1999 | Sanocki et al. |
| 6,613,294 | B2 | 9/2003 | Sanocki et al. |
| 2001/0048903 | A1 | 12/2001 | Sanocki et al. |

FOREIGN PATENT DOCUMENTS

| DE | 37 29 994 A1 | 3/1989 |
| DE | 38 04 559 A1 | 5/1989 |
| DE | 39 22 909 A1 | 1/1991 |
| DE | 40 09 945 A1 | 10/1991 |
| DE | 43 44 303 A1 | 7/1994 |
| DE | 297 09 180 U1 | 9/1997 |

*Primary Examiner*—Tom Duong
(74) *Attorney, Agent, or Firm*—LAurence A. Greenberg; Werner H. Stemer; Ralph E. Locher

(57) ABSTRACT

An apparatus for treating exhaust gases from a mobile internal combustion engine includes at least an exhaust pipe with a direction of extent, a honeycomb body having at least ceramic or extruded material, and at least one metallic fiber mat, which is at least partially disposed between the exhaust pipe and the honeycomb body. At least two zones with different functions are formed in the direction of extent by the at least one fiber mat. At least one first zone serves a function of mounting the honeycomb body, and at least one other zone serves a function selected from the group consisting of thermal insulation and forming a seal against gas. A vehicle having the apparatus is also provided.

10 Claims, 3 Drawing Sheets

FIG. 1
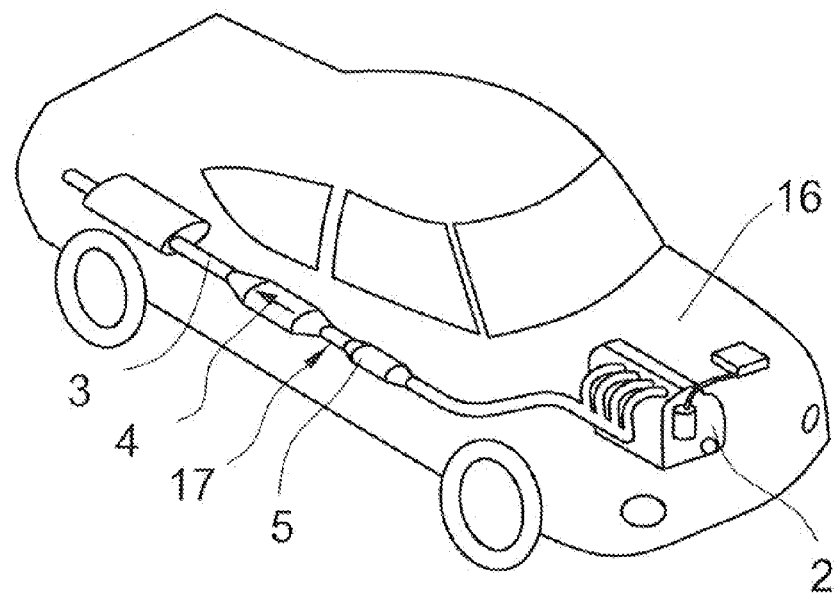
FIG. 2
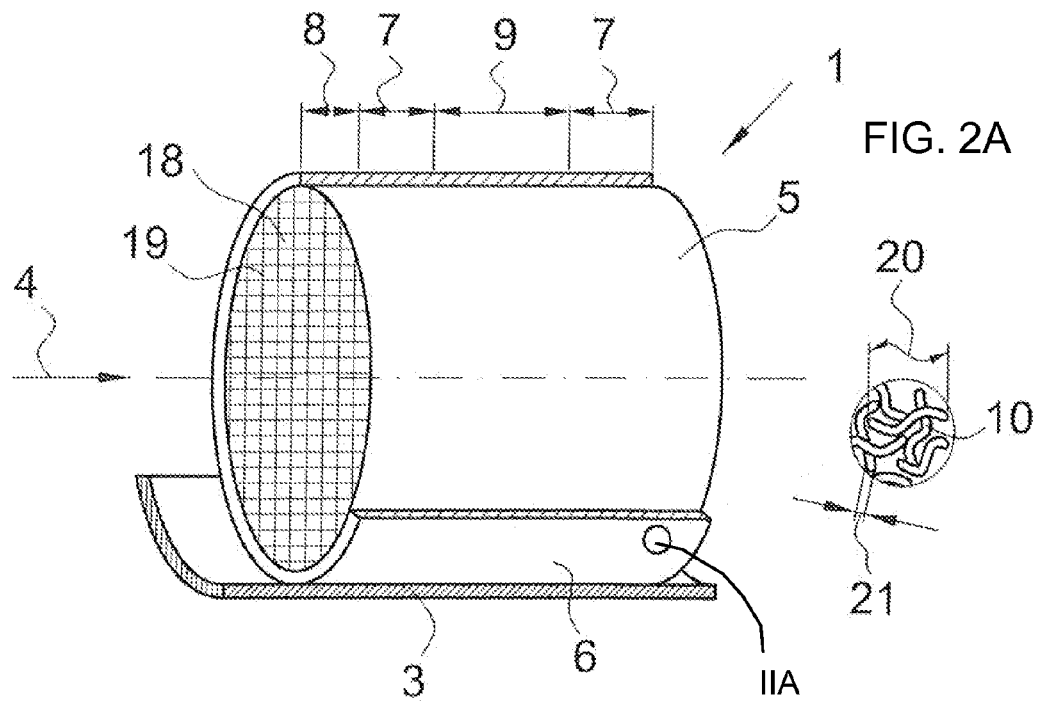
FIG. 2A

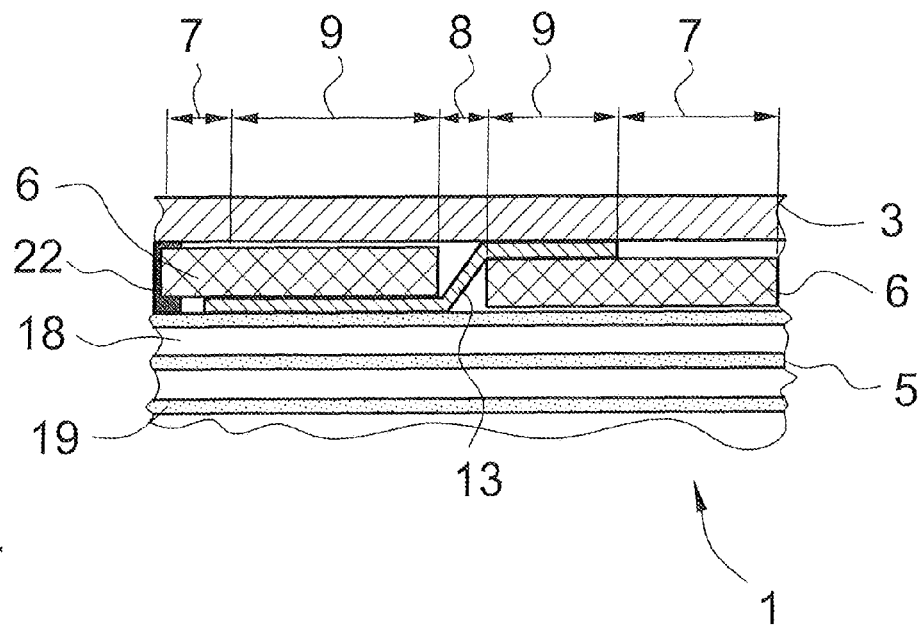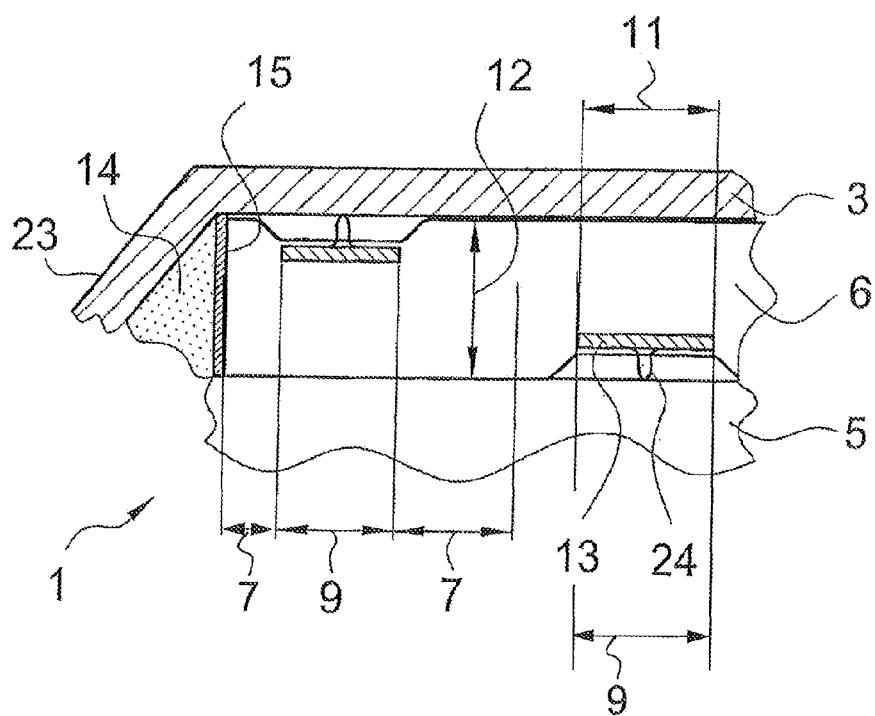

APPARATUS HAVING A FIBER MAT FOR MOUNTING A HONEYCOMB BODY IN AN EXHAUST PIPE FOR TREATING EXHAUST GASES FROM A MOBILE INTERNAL COMBUSTION ENGINE AND VEHICLE HAVING THE APPARATUS

CROSS-REFERENCE TO RELATED APPLICATION

This is a continuation, under 35 U.S.C. §120, of copending International Application No. PCT/EP2006/000494, filed Jan. 20, 2006, which designated the United States; this application also claims the priority, under 35 U.S.C. §119, of German Patent Application DE 10 2005 002 929.9, filed Jan. 21, 2005; the prior applications are herewith incorporated by reference in their entirety.

BACKGROUND OF THE INVENTION

1. Field of the Invention

The invention relates to an apparatus for treating exhaust gases from a mobile internal combustion engine, having at least an exhaust pipe with a direction of extent, a honeycomb body including at least ceramic or extruded material, and at least one metallic fiber mat, which is at least partially disposed between the exhaust pipe and the honeycomb body. The preferred application area for the invention is vehicles, in particular automobiles.

The exhaust systems of mobile internal combustion engines are exposed to considerable thermal and dynamic stresses. They result on one hand from the combustion processes themselves and on the other hand also from the movement of the vehicle. The fluctuating load conditions in the internal combustion engine lead to differing exhaust gas temperatures, exhaust gas compositions, pressure surges, etc. The result thereof is that the components of the exhaust system are also subject to fluctuating thermal stresses. In particular, if the components of the exhaust system include different materials, the respective thermal expansion properties are constantly imposing new demands on the connection between those components and with a view to ensuring that the components remain at the intended position in the exhaust system in the long term. In that context, particular attention needs to be paid to the securing of a honeycomb body, which is produced from ceramic or extruded material, with respect to a usually metallic exhaust pipe.

With configurations of that type, it is known that different thermal expansion properties of the honeycomb body and the exhaust pipe can be compensated for by compensation layers which are disposed between the honeycomb body and the exhaust pipe. That usually involves the use of what are known as swellable mats, which have an ability to take up water. By taking up water contained in the exhaust gas, the mats swell and thereby prevent the assembly formed from the honeycomb body, the swellable mat and the exhaust pipe from coming loose. However, a problem with those swellable mats is that they do not generally satisfy the dynamic requirements in the long term, so that the swellable mat can become partially detached. There is also a risk of the constituents which are dissolved out of the swellable mat being volatilized, and the effect thereof on the environment has not yet been fully clarified.

Another known way of compensating for the different thermal expansion properties is to use spring elements, for example in the form of sleeves, spacers, etc., which are likewise positioned between the honeycomb body and the exhaust pipe. They may also form spaces which are provided with damping materials, such as for example high-temperature-resistant, free-flowing granules or powders. However, constructions of that type are somewhat complex to produce and in some cases are likewise unable to guarantee a long service life.

Moreover, it is also known that knitted metallic wire fabrics can be laid between a ceramic honeycomb body and a metallic exhaust pipe. Examples of such configurations include U.S. Pat. No. 4,158,037 and German Published, Non-Prosecuted Patent Application DE 38 04 559 A1.

SUMMARY OF THE INVENTION

It is accordingly an object of the invention to provide an apparatus having a fiber mat for mounting a honeycomb body in an exhaust pipe for treating exhaust gases from a mobile internal combustion engine and a vehicle having the apparatus, which are able to at least partially alleviate and overcome the hereinafore-mentioned technical problems and disadvantages of the heretofore-known devices and methods of this general type. In particular, it is intended to provide an apparatus which ensures permanent fixing of a corresponding honeycomb body in an exhaust pipe, while preferably at the same time also ensuring a high efficiency with regard to the conversion of pollutants contained in the exhaust gas. Furthermore, the apparatus is to have improved cold-start properties, i.e. is supposed to reach the required light-off temperature of the catalytically active coating after only a very short time. Moreover, the apparatus is intended to be inexpensive and also simple to manufacture in series production.

With the foregoing and other objects in view there is provided, in accordance with the invention, an apparatus for treating exhaust gases from a mobile internal combustion engine. The apparatus comprises an exhaust pipe with a direction of extent, a honeycomb body including at least ceramic or extruded material, and at least one metallic fiber mat at least partially disposed between the exhaust pipe and the honeycomb body. The at least one fiber mat forms at least two zones with different functions in the direction of extent. The at least two zones include at least one first zone having a function of mounting the honeycomb body and at least one other zone having a function selected from the group consisting of thermal insulation and sealing against a gas.

A "mobile internal combustion engine" is to be understood as meaning in particular engines for vehicles (such as for example automobiles, ships, aircraft, etc.), for tools and equipment (such as for example lawnmowers, saws, etc.) and similar, movable internal combustion engines. The fuel used is of no relevance in this context.

The "direction of extent" of the exhaust pipe substantially characterizes the direction of flow of the exhaust gas. The components of an exhaust system are usually positioned in such a way in the exhaust pipe that the exhaust gas can flow through them in the direction of extent of the exhaust pipe.

The term "honeycomb body" is to be understood as meaning, for example, carrier bodies for a catalytically active coating, which have a multiplicity of passages or channels. The passages usually run substantially parallel to one another and in the direction of extent. The passages are bounded by passage walls, which in many cases are formed of an extruded ceramic.

A "fiber mat" is to be understood as meaning a combination of metallic fibers, for example in the form of a woven fabric, a knitted fabric, an irregular layer or the like. The mat may also be referred to as a web, fleece or non-woven material. The metallic fibers used include a material which is able to withstand high temperatures and is resistant to corrosion. They include in particular an iron base material to which alloying elements are added, with at least one alloying element being selected from nickel (18-60% by weight) or chromium (15-25% by weight) advantageously being present. One example of suitable fibers is: 70% by weight of iron, 25% by weight of chromium and 5% by weight of aluminum, although standard impurities may of course also be present.

The fiber mat can be produced by using fibers which are identical or different (for example with regard to the fiber length and fiber diameter). For most applications, just one metallic fiber mat is positioned between the honeycomb body (or a plurality of honeycomb bodies) and the exhaust pipe, but in special circumstances it is also possible to provide a plurality of fiber mats disposed adjacent one another, in particular in the direction of extent.

This concept is now moving away from the preconception that the fiber mat has a pure mounting function. It is therefore proposed that the at least one fiber mat be used to form two zones of different function. In this case, a first zone has a device for mounting the honeycomb body, i.e. it is used for the known function of mounting the honeycomb body. The devices used for this purpose in particular provide a suitable thickness of the fiber mat and/or a type of fiber and/or fiber configuration which has been adapted to the expansion properties of the exhaust pipe and the honeycomb body.

Furthermore, however, at least one other zone is realized, which (at least in part and preferably predominantly) has a different function. As an explanation, it should be pointed out at this point that the term "zone" is to be understood as meaning a particular section between the honeycomb body and the exhaust pipe. The zone may be formed by one fiber mat, by a plurality of fiber mats or between fiber mats.

Another function may reside, for example, in providing a thermal insulation at least in a subregion between the honeycomb body and the exhaust pipe or between these two components toward the fiber mat. The provision of a zone of the fiber mat having a device for thermal insulation allows the operation of heating up the honeycomb body after a cold start to be accelerated, so that the honeycomb body, through contact with the warm or hot exhaust gas, quickly reaches a temperature which allows the catalytic reactions to be started. The provision of an insulation reduces the flow of thermal energy taken up by the honeycomb body out toward colder edge regions, such as for example the fiber mat or the exhaust pipe. This allows, for example, improved conversion properties to be achieved on the part of a honeycomb body constructed as a catalytic converter.

Moreover, it is also possible for this other zone to seal off the at least one fiber mat, i.e. to be made gas-impermeable at least in one direction. The at least one fiber mat generally fills a type of annular space between the honeycomb body and the exhaust pipe. The fiber mat itself, of course, does have a certain porosity, which means that a large number of cavities or passages for a gas are present in the fiber mat. This now enables the exhaust gas to flow past the honeycomb body, which means that there would be a risk of some of the exhaust-gas stream not being converted. In order to avoid this, there are devices for forming a seal with respect to the gas through the use of the at least one metallic fiber mat. This leads to more efficient conversion of pollutants in the exhaust gas. For this purpose, the metallic fiber mat is preferably formed by using fibers which have a fiber diameter in a range of from 0.02 to 0.1 mm (in particular 0.02 to 0.06 mm). In this case, the exhaust gas flows onto the fiber mat over the thickness of the fiber mat, so that the fiber mat can be sealed over the length of the fiber mat. This may mean that the fiber mat itself can have a certain porosity provided that it is impossible for a significant flow of exhaust gas to penetrate through the fiber mat over the length of the fiber mat (e.g. between 5 mm and 15 mm). In this case, the porosity may vary, for example in a range up to 80%, with a preferred range being from 60% to 80%.

In accordance with another feature of the invention, the first zone includes only metallic fibers which are connected to one another. In this case it is therefore proposed for the type of fiber or the type of mat to be selected by taking into account the different thermal expansion properties of the honeycomb body and the exhaust pipe which are present. This first zone of the fiber mat is advantageously under permanent compressive load, so that this first zone ensures permanent contact of the fiber mat toward the exhaust pipe and toward the honeycomb body. The metallic fibers are connected to one another by technical joining, in particular by high-temperature brazing, sintering, welding etc. It is particularly preferable for the metallic fibers to have a fiber diameter in a range of from 0.1 mm to 0.4 mm. The fibers are preferably constructed as "endless" fibers and braided together to form a type of knitted wire fabric. If the fiber mat is configured as a type of irregular fiber layer, it preferably includes fibers with a mean fiber length in a range of from 5 mm to 25 mm. It should also be noted that the fiber mat may be substantially smooth or at least partially structured, in which case a corrugated structure is preferred in particular when using the configuration as a knitted wire fabric.

In accordance with a further feature of the invention, with regard to a honeycomb body, a plurality of first zones are provided, between which the at least one other (second, third, etc.) zone is provided. The provision of a plurality of first zones, in particular two first zones, is intended to ensure locally limited and uniform mounting of the honeycomb body. The first zones in this case are each advantageously disposed in the vicinity of the end sides of the honeycomb body. This produces a central section which is suitable for other functions which are realized by the further zones. In this case, this central section is advantageously larger than the first zones, in particular if the centrally disposed other zone has a device for thermal insulation.

In accordance with an added feature of the invention, the plurality of first zones are constructed with a separate fiber mat, these being connected to the device of the at least one other zone. This means, for example, that the separate fiber mats of the first zones are connected to one another by way of a separate component without themselves being in direct contact with one another. Components of this type may be pins, metal sheets, hooks or similar, in particular metallic, components. They are captively connected to the respective fiber mat, in particular by high-temperature brazing, welding or being hooked together. In this way it is possible for the respective fiber mats to be selected appropriately, taking into account the position in the exhaust system and/or the stresses, so that the fiber mats, for example, have different properties. A connection between these two fiber mats is now made possible by separate components, which in addition to their holding function in particular also have a further function, e.g. an insulating and/or sealing function. This allows a very flexible structure, while at the same time ensuring inexpensive manufacture even as part of series production.

In accordance with an additional feature of the invention, the at least two zones differ at least in terms of their zone length in the direction of extent or zone thickness perpendicular to the direction of extent. A configuration in which the first zone overall has a predetermined zone length which is shorter than the sum of the zone lengths of the other zones is preferred in this context. In principle, each individual zone may have a separate zone length and/or zone thickness, but it is also possible for a plurality of zones, (in particular of the same function) to have the same zone length and/or zone thickness.

In accordance with yet another feature of the invention. It is also proposed that the device for thermal insulation be disposed in such a way that it surrounds the honeycomb body. Therefore, the device for thermal insulation constitutes a protective sleeve with regard to heat conduction or thermal radiation in the radial direction. In this way, heat transfer from the honeycomb body which is heating up to the environment is significantly reduced. The device for thermal insulation may in this case also include a plurality of devices disposed concentrically with respect to one another.

In accordance with yet a further feature of the invention, the device for thermal insulation includes a foil-like layer which has lower heat conduction properties than the at least one fiber mat. The foil-like layer may be disposed on one of the surfaces of the fiber mat layer, but it is also possible for the foil-like layer to be integrated or incorporated in the fiber mat. The foil-like layer advantageously includes at least one of the following materials: iron base material with at least one alloying element selected from the group consisting of nickel, chromium, aluminum. The layer thickness is in a range of from 0.03 mm to 0.2 mm.

In accordance with yet an added feature of the invention, the device for forming a seal with respect to a gas extends over the entire zone thickness. In this case, the device for forming a seal preferably on one side bears directly against the honeycomb body and on the other side bears directly against the exhaust pipe. It is very particularly preferred for these devices to be connected by technical joining at least toward one component out of the honeycomb body and the exhaust pipe. The device for forming a seal is advantageously constructed in such a way that it can compensate for the different distances between the honeycomb body and the exhaust pipe which occur in use through the use of (elastic) deformation without losing contact with the components.

In accordance with yet an additional feature of the invention, the device for forming a seal with respect to a gas is provided by at least one of the following devices:
- a different type of fibers as compared to the first zone,
- a different configuration of the fibers as compared to the first zone,
- additional filling material, or
- an additional gas-impermeable barrier element.

The type of fibers is distinguished, for example, by the material, the fiber length, the fiber diameter, the fiber surface area, etc. The configuration of the fibers relates, for example, to the mixing ratio of different fibers, their orientation with respect to one another, the way in which the fibers are connected to one another, etc. For example, it is now possible for a zone which is virtually sealed with respect to gas to be formed by relatively thick fibers which are disposed in a particular way, for example in the form of a woven fabric. To provide assistance, it is possible, for example, to admix additional filling material, which places itself in remaining cavities or on the surface of the fiber mat in such a way that the fiber mat is ultimately impermeable to gas. At the same time, it is also possible for a gas-impermeable barrier element to be positioned between the fiber mats, integrated in a fiber mat and/or positioned on a fiber mat. The barrier element being used may, for example, be sheet-metal strips, sealing rings, sealing lips, etc.

In accordance with again another feature of the invention, a device for thermal insulation and a device for forming a seal with respect to a gas are provided in the at least one other zone and these devices are formed as a single piece. This is to be understood as meaning in particular that one component performs both functions, for example by this component including a suitable material for thermal insulation while at the same time being disposed in such a manner as to form a seal with respect to or against gas.

With the objects of the invention in view, there is concomitantly provided a vehicle, comprising a mobile internal combustion engine, and an exhaust system having an apparatus according to the invention.

Other features which are considered as characteristic for the invention are set forth in the appended claims. In this context, it should be noted that the features which are listed individually in the claims can be combined with one another in any technologically appropriate way, and likewise represent possible configurations of the apparatus according to the invention. Further features of the description can be used to further characterize the apparatus according to the invention.

Although the invention is illustrated and described herein as embodied in an apparatus having a fiber mat for mounting a honeycomb body in an exhaust pipe for treating exhaust gases from a mobile internal combustion engine and a vehicle having the apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention is explained in more detail below with reference to the figures. It should be noted that the figures show particularly preferred exemplary embodiments of the invention, but the invention is not restricted to these embodiments. It should also be noted that the illustrations in the figures are diagrammatic, and in particular they are not generally suitable for illustrating size ratios.

BRIEF DESCRIPTION OF THE SEVERAL VIEWS OF THE DRAWING

FIG. 1 is a diagrammatic, perspective view of a vehicle with an exhaust system;

FIG. 2 is a fragmentary, perspective view of an exhaust pipe, honeycomb body and fiber mat;

FIG. 2A is an enlarged, perspective view of a portion IIA of FIG. 2;

FIG. 3 is a fragmentary, longitudinal-sectional view of a variant embodiment of the metallic fiber mat with a plurality of zones;

FIG. 4 is a fragmentary, longitudinal-sectional view of a further variant embodiment of a fiber mat with a plurality of zones.

DETAILED DESCRIPTION OF THE INVENTION

Figure 5:
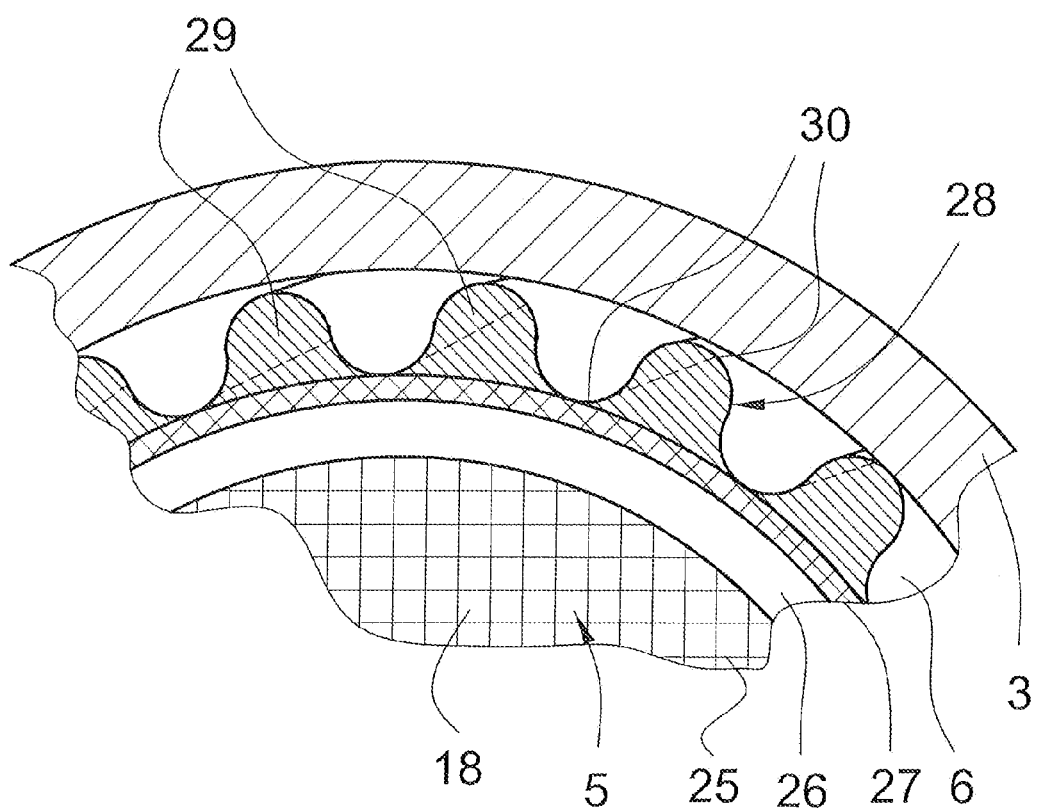
FIG. 5 is a further enlarged, cross-sectional view of another variant embodiment of a fiber mat with a honeycomb body.

Referring now to the figures of the drawings in detail and first, particularly, to FIG. 1 thereof, there is seen a diagrammatic illustration of a vehicle 16 which includes a mobile internal combustion engine 2 (e.g. a spark-ignition or diesel engine). The exhaust gas generated in the internal combustion engine 2 is passed through an exhaust system 17, with the pollutants contained in the exhaust gas being converted and the exhaust gas ultimately being discharged to the environment. The exhaust system 17 includes a plurality of components which are disposed in an exhaust pipe 3. For example, in the direction of the extent 4 of the exhaust pipe 3, the exhaust gas flows through a plurality of honeycomb bodies 5 which have different functions. By way of example, the honeycomb bodies 5 may be configured as catalytic converters, filters, particulate separators, adsorbers, heating elements, mixers or the like.

FIG. 2 diagrammatically depicts an apparatus 1 for treating exhaust gases, having a honeycomb body 5 made from ceramic material. The honeycomb body 5 includes a multiplicity of passages or channels 18 which are formed by passage walls 19. The honeycomb body 5 in this case is illustrated in the form of a cylinder, but other configurations of the honeycomb bodies 5 are also feasible in principle. A metallic fiber mat 6 is disposed around the honeycomb body 5 and is used to hold the honeycomb body 5 in the exhaust pipe 3. In the variant embodiment shown, the metallic fiber mat 6 is formed over the entire length of the honeycomb body 5 in the direction of extent 4, but this is not absolutely imperative. As can be seen in FIG. 2A, the metallic fiber mat, web, fleece or non-woven material 6 is constructed with fibers 10 which have a predeterminable fiber length 20 and a predeterminable fiber diameter 21.

As is seen in the direction of extent 4, the metallic fiber mat 6 has a plurality of zones of different functions. First of all there is a second zone 8, which has a device for forming a seal with respect to a gas. This is followed by a first zone 7 including a device for mounting the honeycomb body 5. This is then followed by a third zone 9 including a device for thermal insulation. The zones are completed by another first zone 7 including a device for mounting the honeycomb body 5. A configuration of the zones 7, 8, 9 of this type has the advantage that (if the direction of flow of the exhaust gas corresponds to the direction of extent 4) the hot exhaust gas comes into contact firstly with the second zone 8, which prevents the exhaust gas from penetrating further into the metallic fiber mat 6. The mounting of the honeycomb body 5 is in principle effected by the two first zones 7 which are annular in form and are disposed in the vicinity of the end sides of the honeycomb body 5. Between these two first zones 7 there is the relatively large third zone 9, in which the thermal insulation has a particularly great effect. The second and third zones may be referred to together as at least one other zone.

FIG. 3 shows a portion of the apparatus 1 for treating exhaust gases. The honeycomb body 5 in this case is illustrated with a multiplicity of the passages 18 and the passage walls 19 are shown in section. A plurality of components which can be assigned to different zones based on their function are disposed between the honeycomb body 5 and the exhaust pipe 3. In the illustrated variant embodiment, the connection between the honeycomb body 5 and the exhaust pipe 3 is realized through the use of two separate fiber mats 6 which are spaced apart from one another in the direction of extent 4 and are connected through the use of a foil-like layer 13 which is in contact with both fiber mats 6. As an additional protective measure, a protective element 22 is provided in the region of an end face of the fiber mat 6 illustrated on the left. The intention is for this protective element 22 to prevent the fibers from being directly exposed to the dynamic loads.

As is seen in the direction of extent 4, i.e. from left to right in FIG. 3, the fiber mats provide the following zones: a first zone 7, which is used to mount the honeycomb body 5 with respect to the exhaust pipe 3. This is followed by a third zone 9 with a device for thermal insulation. The foil-like layer 13 is disposed between the fiber mat 6 and the honeycomb body 5 as a device for thermal insulation. This layer 13 impedes heat transfer from the honeycomb body 5 to the fiber mat 6 and to the exhaust pipe 3. This is followed by a second zone 8 which has a device for forming a seal with respect to a gas. The device is once again realized by a foil-like layer 13, since the configuration selected for the second zone 8 is now such that the layer 13 bridges a gap between the honeycomb body 5 and the exhaust pipe 3. Consequently, it is impossible for any exhaust gas to flow through the second zone 8 in the direction of extent 4 or direction of flow. A third zone 9 with a device for thermal insulation is again provided in the section in which the layer 13 now bears against the exhaust pipe 3, namely between the second fiber mat 6 and the exhaust pipe 3. This is followed by another first zone 7 with a device for mounting the honeycomb body 5.

FIG. 4 shows another variant embodiment of a fiber mat 6 disposed between the honeycomb body 5 and the exhaust pipe 3. In order to position the fiber mat 6, the exhaust pipe 3 is constructed with a projection 23, against which the metallic fiber mat 6 bears. In the region of the metallic fiber mat 6 illustrated on the left, this fiber mat 6 is provided with a filling material 14. The filling material 14 is used, for example, to stabilize the fiber assembly, to form a seal or also as a catalyst for the conversion of pollutants. This is followed by a barrier element 15 which is used to seal off the fiber mat 6. This barrier element 15 is in turn adjoined by a section in which the fiber mat 6 is in direct contact both with the honeycomb body 5 and with the exhaust pipe 3, so as to generate a first zone 7 with a device for mounting the honeycomb body 5. Thereafter, a zone thickness 12 of the metallic fiber mat 6 changes, with a third zone 9 being formed by integration of the foil-like layer 13. The layer 13 is additionally provided with a spring element 24 so that through the use of a very small contact region with the exhaust pipe 3, it is nevertheless ensured that the metallic fiber mat 6 bears permanently against the honeycomb body 5 in the region of the third zone 9. On the right-hand side, this third zone 9 in turn adjoins a first zone 7, which again has an increased zone thickness 12. To the right of this can be seen a third zone 9, the zone length 11 of which is substantially determined by the configuration of the layer 13. In this case too, the layer 13 has a spring element 24, which is now intended in particular to ensure that contact between the fiber mat 6 and the honeycomb body 5 is suppressed in the region of this third zone 9, so as to form an additional air gap which also serves for thermal insulation.

FIG. 5 shows a fragmentary view of another variant embodiment of a fiber mat 6 with a honeycomb body 5. The ceramic honeycomb body 5 in this case has thin passage walls 25 and a thicker outer wall 26, which allows a higher compressive loading of the honeycomb body 5. A fiber mat 6 is in turn disposed between the exhaust pipe 3 and the honeycomb body 5. In this case, this fiber mat is not smooth, but rather has a structure 28 which has regular extremities 30, e.g. peaks and valleys. It is preferable for these extremities 30 to run not parallel but transversely to the direction of extent of the passages 18. The illustrated fiber mat 6 is constructed as a type of knitted wire fabric and has "endless" fibers with a fiber diameter of 0.2 mm. Therefore, the fiber mat 6 has an inherent stability which maintains the structure 28. In order to provide the fiber mat 6 with a sealing function, it is possible for closures 29 to be incorporated in the structure 28 (on both sides). There is a pressure distributor 27 in order to avoid pressure peaks in the region of contact of the structured fiber mat 6 through the extremities 30 to the honeycomb body 5. The pressure distributor 27 may also be formed, for example, with a smooth irregular fiber layer.

In principle, it should also be pointed out that a plurality of honeycomb bodies can be fixed in the exhaust pipe (simultaneously or separately from one another) using the configurations of fiber mats and additional elements described herein. The configurations of the individual zones with respect to one another can also be varied substantially freely in this context. It is preferable for a device for thermal insulation to be provided in a region of the honeycomb body which the exhaust gas to be purified reaches first, in order to ensure that this region is heated up and reaches its light-off temperature as early as possible. Once the catalytic action has been started, the increase in temperature propagates virtually independently through the honeycomb body.

The invention claimed is:

1. An apparatus for treating exhaust gases from a mobile internal combustion engine, the apparatus comprising:
    an exhaust pipe with a direction of extent;
    a honeycomb body including at least ceramic or extruded material;
    said exhaust pipe and said honeycomb body defining a gap therebetween;
    at least first and second metallic fiber mats at least partially disposed between said exhaust pipe and said honeycomb body and mutually spaced apart in said direction of extent, said at least first and second fiber mats forming at least three zones with different functions in said direction of extent;
    said at least three zones including at least one first zone having a function of mounting said honeycomb body, at least one third zone having a function of thermal insulation and at least one second zone having a function of sealing against a gas;
    said at least one first zone including only metallic fibers connected to one another; and
    said at least one second zone and said at least one third zone being at least partially formed of a foil-like layer, said foil-like layer being partially disposed between said first fiber mat and said honeycomb body, said foil-like layer being partially disposed between said second fiber mat and said exhaust pipe and said foil-like layer thereby forming a seal with respect to a gas by bridging said gap.

2. The apparatus according to claim 1, wherein said at least one first zone is a plurality of first zones relative to said honeycomb body, and said at least one second zone and said at least one third zone are disposed between said first zones.

3. The apparatus according to claim 2, wherein said plurality of first zones are constructed with separate fiber mats being connected by said at least one second zone and said at least one third zone.

4. The apparatus according to claim 1, wherein said at least three zones differ with regard to a zone length thereof in said direction of extent or a zone thickness thereof perpendicular to said direction of extent.

5. The apparatus according to claim 1, wherein said thermal insulation function is provided by a device for thermal insulation surrounding said honeycomb body.

6. The apparatus according to claim 5, wherein said device for thermal insulation includes said foil-like layer having lower heat conduction properties than said at least one fiber mat.

7. The apparatus according to claim 1, wherein said sealing function is provided by a device for forming a seal against gas extending over an entire zone thickness.

8. The apparatus according to claim 7, wherein said device for forming a seal against gas is provided by at least one of the following devices:
    a different type of fibers as compared to said at least one first zone;
    a different configuration of fibers as compared to said at least one first zone;
    additional filling material; or
    an additional gas-impermeable barrier element.

9. The apparatus according to claim 1, wherein said thermal insulation function and said sealing function are respectively provided in said at least one third zone and said at least one second zone by a device for thermal insulation and a device for forming a seal against gas, said devices being formed as a single part.

10. The apparatus according to claim 1, wherein said gap is bridged only by said foil-like layer in said second zone.

* * * * *